Figure 4:
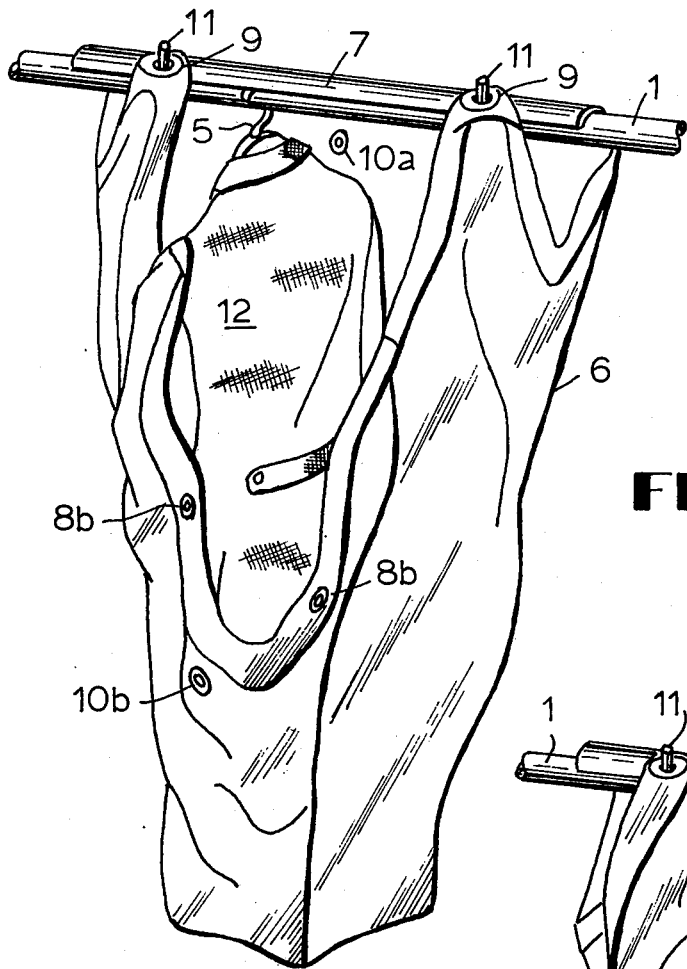

United States Patent [19]

Usner

[11] 4,140,163
[45] Feb. 20, 1979

[54] GARMENT TROLLEY BAR SHROUD

[76] Inventor: Daniel C. Usner, 10958 Tanager Trail, Brecksville, Ohio 44141

[21] Appl. No.: 887,711

[22] Filed: Mar. 17, 1978

Related U.S. Application Data

[63] Continuation-in-part of Ser. No. 730,197, Oct. 6, 1976, Pat. No. 4,079,840.

[51] Int. Cl.² ............................................. B65D 33/14
[52] U.S. Cl. ........................................... 150/5; 150/3; 206/287
[58] Field of Search ................. 150/1, 3, 5, 6; 229/62; 206/287

[56] References Cited

U.S. PATENT DOCUMENTS

| 1,286,225 | 12/1918 | Capen | 150/5 |
| 2,064,594 | 12/1936 | Dickey | 150/3 |
| 2,078,438 | 4/1937 | Baxter | 150/1 |
| 2,421,067 | 5/1947 | Howe | 150/3 |

Primary Examiner—Donald F. Norton
Attorney, Agent, or Firm—Milton L. Simmons

[57] ABSTRACT

A bag-like shroud is provided for a garment trolley bar for the purpose of both protecting, and preventing displacement in transit of, hanger-hung garments carried by said trolley bar.

6 Claims, 5 Drawing Figures

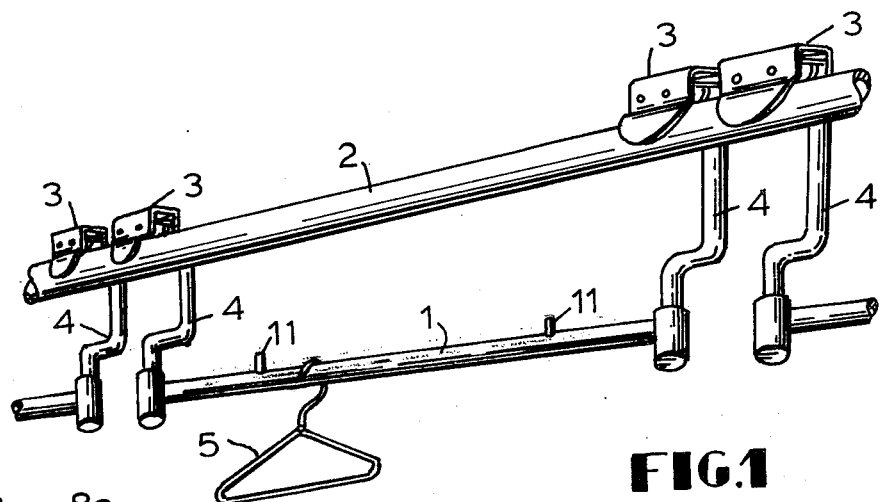
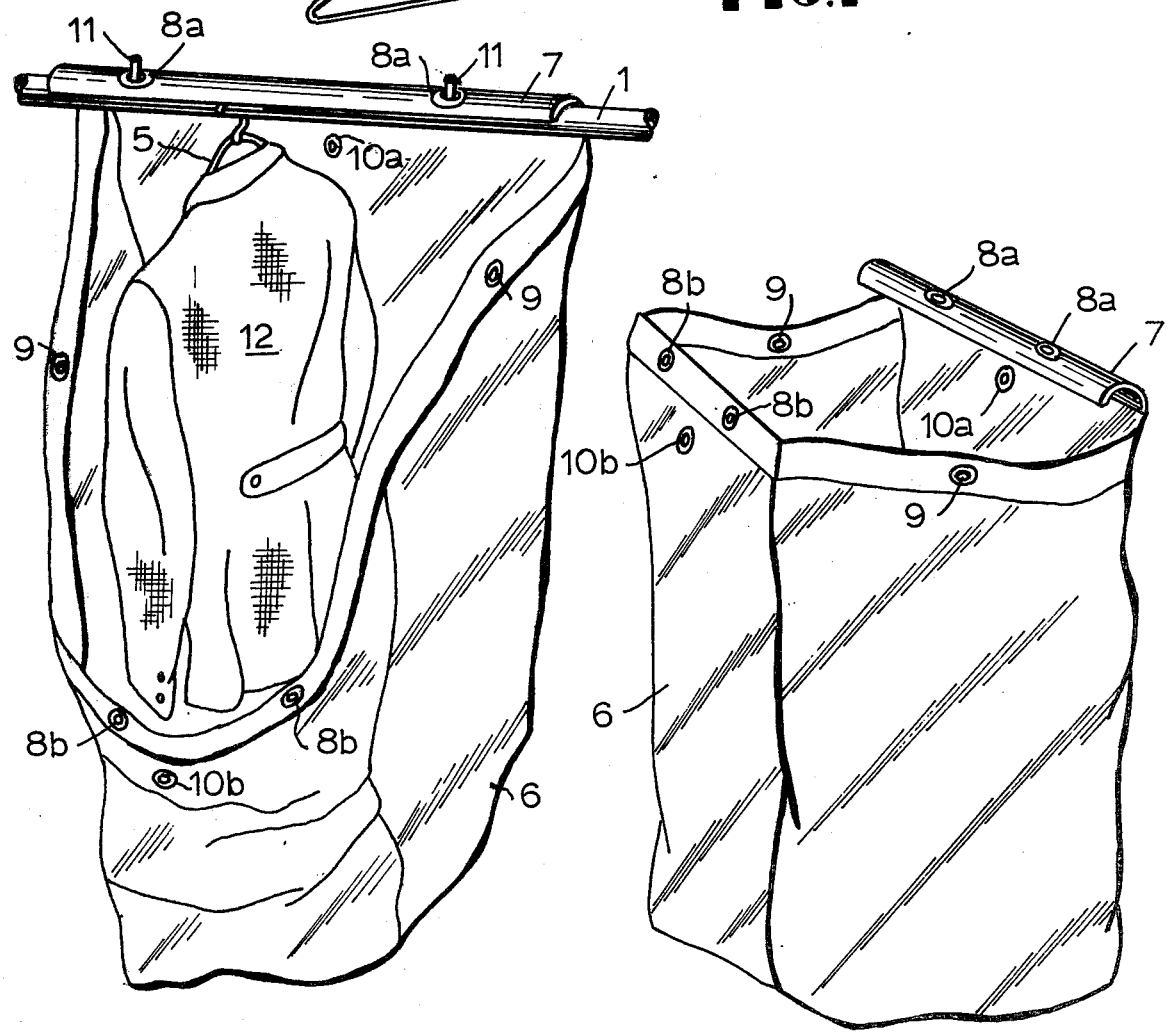
FIG.1
FIG.3  FIG.2

GARMENT TROLLEY BAR SHROUD

This application is a continutation-in-part of copending U.S. application Ser. No. 730,197, filed Oct. 6, 1976, now U.S. Pat. No. 4,079,840, issued on Mar. 21, 1978.

In the garment trade, in transporting hanger-hung garments from wholesale to retail facilities, from warehouse to sales floor, etc., it is the practice to expedite such transfer by hanging the garments on a trolley bar at an initial point, and transferring the trolley bar from one trolley rail to another at various points in transit.

For example, at an initial point, a series of garments might be hung on a trolley bar rollably suspended from a trolley rail having a terminus at a truck loading platform. By the simple expedient of temporarily connecting said trolley rail terminus with a series of short trolley rails disposed in the ceiling of a delivery truck, the entire trolley bar load of garments may be rolled into the truck.

Upon delivery of the truck load of trolley-borne garments at an unloading platform, the procedure is reversed, and the trolley-borne garments are rolled out of the truck at their destination, on to a trolley rail, from whence the entire trolley load of garments may be readily and easily transferred to the next processing point for temporary storage, retailing, etc., via trolley.

One of the problems encountered heretofore is that, considering that garments may be both extremely expensive and light in color, the normal jostling and jarring in transit of the delivery truck inevitably results in a number of hanger-hung garments bouncing off the trolley bar onto the floor of the delivery truck, where they are frequently either irreparably soiled, or require special, expensive dry cleaning.

Another problem of soiling arises from exposure of trolley-borne garments to the frequently dirty, dusty atmosphere both outdoors in transit and within the confines of indoor storage facilities.

While a number of complicated hold-down devices have been utilized in the past, they tend to be unwieldy, awkward, and have little incentive for employees to use them properly, or indeed, to even use them at all.

It is therefore an object of this invention to provide a relatively simple, lightweight, efficient and effective trolley bar locking and restraining shroud for both preventing the removal or displacement of garment hangers from a trolley bar due to normal vibration and bouncing generally incident to handling and/or truck transport, and protecting hanger-hung garments from air-borne dust and soil.

As used herethroughout, "shroud" is intended to mean a combination hold-down device and bag-like cover for garments carried by hangers suspended from a trolley bar. So defined, throughout the specification and claims, repeated detailed description thereof is thereby obviated.

Figure 5:
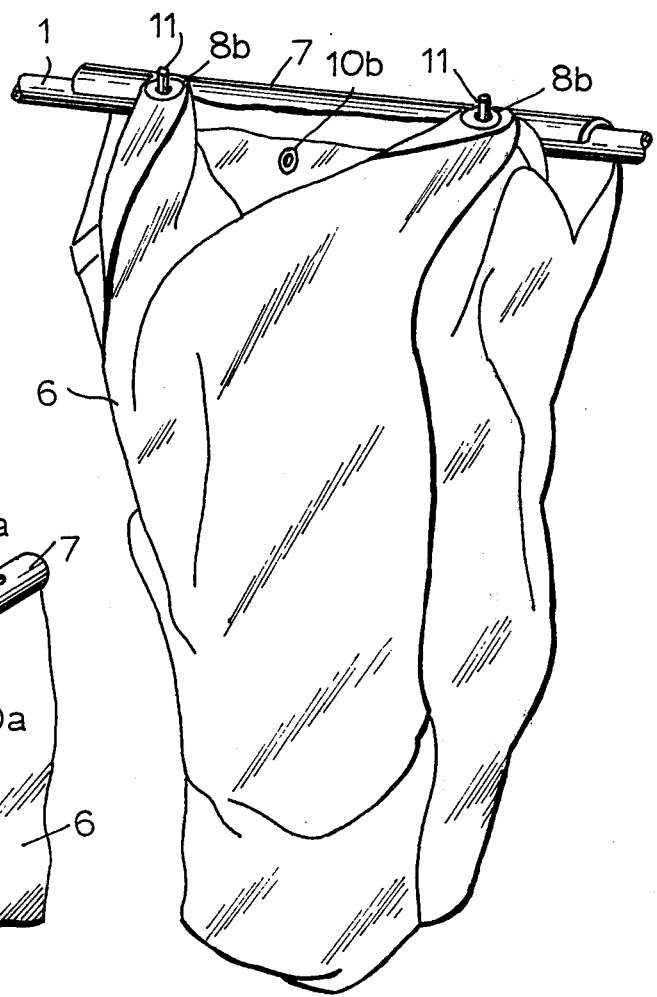

Referring now to the drawings attached hereto:

FIG. 1 is a general perspective view of a well-known trolley bar rollably suspended from a trolley rail, having an illustrative garment hanger-hung therefrom, the latter of which forms no part of this invention; and FIG. 2 is a perspective view of the shroud of this invention; and FIG. 3 is a perspective view of the shroud of this invention mounted in its initial attitude on a garment-hung trolley bar; and FIG. 4 is a perspective view of the shroud of this invention in step 2 toward final closure; and FIG. 5 is a perspective view of the shroud of this invention in its final, closed, clamping and restraining attitude.

Figure 6:
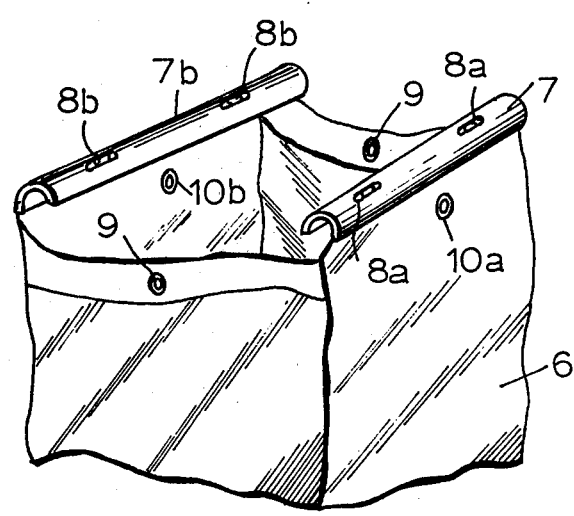

FIG. 6 is a perspective view of a slightly modified shroud as depicted in FIG. 2.

Referring now to the drawings by way of describing the structure of this invention, FIG. 1 depicts a conventional trolley bar, generally designated as 1, which is suspended from tubular trolley rail 2 by two pairs of sheaves 3 at each end thereof.

As will be readily apparent, the trolley bar may be readily hung on to the trolley rail, and removed therefrom, by virtue of the offset arms 4; the trolley bar 1 suspended between sheaves 3 by arm 4, from which garment hangers 5 may be hung.

Referring now to FIG. 2, the bag-like shroud of this invention is designated generally as 6, and may be composed of any suitable, cloth or plasticized sheet resin material. For convenience, the bag has been depicted generally as somewhat rectangular, though its cross section and corresponding opening may just as easily be circular, oblong, etc.

A segment of the edge defining the opening in said shroud has been stiffened over a portion of its length by conventionally sewing into a suitable closed seam formed thereon, a linear, substantially rigid, locking member having a generally semi-cylindrical cross-section, the interior diameter of which conforms substantially to the outside diameter of trolley bar 1. The reinforced segment is designated by reference numeral 7.

In the initial embodiment of this invention, a length of rigid, plastic pipe having an appropriate interior diameter was slit its length, sewn into a seam as shown, and served to provide a suitable stiffening member for segment 7; though any substantially rigid, linear, semi-cylindrical article will suffice.

As will be seen from in FIG. 3, a garment 12 has been suspended by garment hanger 5 from trolley bar 1, following which member 7 of shroud 6 has been placed in overlapping, clamping relationship onto the upper surface of trolley bar 1, via two corresponding, grommeted openings 8a along the upper edge of member 7.

Referring to FIG. 4, depicting the clamping and restraining shroud of this invention, in the second step of utilization thereof, grommeted openings 9 of said shroud have now been lifted and placed in overlapping relationship with respect to grommeted openings 8a over vertical upright members 11.

In FIG. 5, the final clamping and restraining attitude is achieved with the placing of grommeted openings 8b, respectively, in overlapping relationship with respect to grommeted openings 9 and 8 as depicted in FIG. 4.

It will be readily apparent now from FIGS. 4 and 5 that grommeted openings 10a and 10b, having been positioned diametrically opposed to each other, are in substantial abbutting relationship immediately beneath trolley bar 1 in FIG. 5.

If a measure of security against pilferage is desired, a self-locking plastic seal strip may be readily slipped through grommeted openings 10a and 10b, looped over the top of the entire assembly, including rigid locking member 7, and secured. Or a padlock, along the lines of a bicycle lock, could be used to lock the assembly in like manner. Though this feature is not essential to the primary clamping and restraining function of the shroud.

Upright members 11 prevent lateral displacement of the garment hanger hooks, once they are clamped beneath restraining member 7; obviously several more upright members 11 could be utilized to further restrict lateral hanger displacement, with additional, corresponding grommeted openings made in the shroud, member 7, etc.

While there are small, "V"-like openings at each end of the shroud following complete closure immediately beneath the trolley bar, as shown in FIG. 5, the bag-like, flexible material of which the shroud is made tends to fall together and close these openings sufficiently to prevent air-borne dust and soil from getting to the garments.

The advantage of this invention will be readily apparent in that it can be used to clamp the garment hangers to the trolley bar, thereby preventing them from being displaced in transit, and a number of upright members 11 may be incorporated to further restrict lateral, sliding displacement of hangers and garments in transit.

The necessity of requiring individual garment covers for each garment is obviated by the shroud of this invention, though obviously this is a matter of choice.

Furthermore, even if a violent jar at some point in transit should result in one or two garments either slipping from their hangers, or the hangers themselves somehow bouncing loose from the trolley bar, they will be caught in the bottom of the shroud for safekeeping, and prevented thereby from coming in contact with the floor of either a truck or warehouse.

Again, locking garment openings 10a and 10b are optional, as the weight of the shroud itself, which weight is carried primarily by rigid locking member 7, would be sufficient to prevent dislocation of garment hangers except under extremely rough transit conditions.

Locking grommeted openings 10a and 10b may also be increased in number to include 1, 2 or more pairs of opposed locking openings, if desired.

While it is relatively simple for a determined thief to slit a sealed shroud and thereby gain access to its contents, it is to be understood that the locking feature provided by grommeted openings 9a and 9b is intended to be more of a theft deterrent; it would certainly be sufficient to point the finger if, for example, a shroud were sealed at a loading point, and found broken at the point of destination following transit.

While the preferred embodiment of this invention indicates only a single locking and restraining segment 7, from FIG. 6 it will also be apparent that a similar, corresponding, semi-cylindrical segment could be sewn into the opposing edge of the shroud, wherein the grommeted openings 8b appear. The second member would have either a slightly larger or smaller inside diameter with respect to member 7, so that the entire opposing edge could be placed in overlapping or underlapping relationship with respect to member 7, as depicted in FIG. 5.

As will be readily apparent, if two opposed rigid members 7 are provided, it is of secondary importance which is placed initially on trolley bar 1, so long as the second position in achieving final closure involves grommeted openings 9 placed in overlapping relationship with respect to the stiffened, rigid segment first placed on trolley bar 1.

Naturally, in the case of a shroud having two opposed rigid members 7, it is preferred that the "first on" have an inside diameter corresponding essentially to the outside diameter of the trolley bar, while the "second on" have an inside diameter corresponding generally to the outside diameter of the "first on".

Having thus described the invention hereof, I claim:

1. A garment trolley bar shroud, such shroud being generally flexible and non-rigid, with an opening at one end thereof defined by a substantially continuous edge, a segment of said edge reinforced by an arcuate, substantially rigid reinforcing member adapted to fit over said bar in snug, conforming relationship, at least one first opening through said reinforcing member for receiving therethrough an upright member disposed atop said trolley bar when said reinforcing member is placed atop thereof in snug, conforming relationship; a second opening in the unreinforced segment of said edge substantially diametrically opposed to said first mentioned opening for receiving the aforementioned upright member when that unreinforced segment of said edge is disposed atop said bar in overlapping relationship with respect to said reinforced edge and said first opening.

2. The shroud of claim 1 wherein said reinforcing member has more than one first mentioned opening therethrough, said first mentioned openings are adapted to receive a corresponding number of upright members disposed atop said trolley bar, when said reinforcing member is placed atop thereof in snug, conforming relationship, and an equal number of second mentioned openings in the unreinforced segment of said unreinforced edge substantially diametrically opposed to said first mentioned openings for receiving the aforementioned upright members when said unreinforced segment of said edge is placed atop said bar in overlapping relationship with respect to said reinforced edge.

3. The shroud of claim 2 wherein there are two additional third mentioned openings in the unreinforced edge segment of said shroud, positioned substantially diametrically opposed to each other along a line substantially at right angles to a line connecting two opposed first and second mentioned openings, each third mentioned opening adaptable to be positioned in overlapping relationship over an adjacent first mentioned opening and its upright member, and to receive an adjacent second mentioned opening over said upright member in overlapping relationship with respect to said first and third mentioned openings.

4. A garment trolley bar shroud, such shroud being generally flexible and non-rigid, with an opening at one end thereof defined by a substantially continuous edge, two opposed segments of said edge each reinforced by an arcuate, substantially rigid reinforcing member adapted to fit over said bar and each other in snug, conforming relationship, at least one opening through each said reinforcing member for receiving therethrough an upright member disposed atop said trolley bar when said reinforcing members are placed atop thereof in snug, conforming, overlapping relationship with respect to said bar and each other.

5. The shroud of claim 4 wherein said reinforcing members each have more than one opening therethrough, said openings adapted to receive a corresponding number of upright members disposed atop said trolley bar when said reinforcing members are in position atop said bar in overlapping relationship with respect to said bar and each other.

6. The shroud of claim 5 wherein there are two additional openings in the unreinforced edge segment of said shroud, positioned substantially diametrically opposed to each other and each approximately equidistant from each opposed reinforcing member, each of said two additional openings adaptable to be positioned in overlapping relationship over an adjacent opening and its reinforcing member, when said other reinforcing member is positioned in overlapping relationship with respect to said bar, said first mentioned reinforcing member and said two additional openings.

* * * * *